United States Patent Office 3,155,677
Patented Nov. 3, 1964

3,155,677
SYNTHESIS OF PYRIDYL ALKYL KETONES
Ralph H. Feldhake, Indianapolis, Ind., assignor to Reilly Tar & Chemical Corporation, Indianapolis, Ind., a corporation of Indiana
No Drawing. Filed Dec. 10, 1962, Ser. No. 243,660
16 Claims. (Cl. 260—297)

My invention relates to a chemical process. More particularly, it relates to a process of preparing pyridyl alkyl ketones.

Pyridyl alkyl ketones are well-known organic compounds. They are important in the synthesis of a wide variety of organic compounds, especially those of interest in the medicinal field.

The preparation of pyridyl alkyl ketones on the laboratory scale can be accomplished in several ways. Cyanopyridines have been converted to the pyridyl alkyl ketones with alkyl magnesium iodide [Teague et al., J. Am. Chem. Soc., 75, 3429–30 (1953)]. Pyridine carboxylic acid esters can be reacted with acetic acid esters in the presence of sodium ethoxide to give pyridyl alkyl ketones [Gilman et al., J. Am. Chem. Soc., 68, 2399–2400 (1946)]. Calcium acetate fused with calcium nicotinate has been used to make 3-pyridyl methyl ketone [Engler et al., Ber. 22, 597–9 (1899)]. 3-pyridyl methyl ketone has been prepared by passing a mixture of ethyl nicotinate and acetic acid over a catalyst [Webb et al., J. Am. Chem. Soc., 71, 2285–6 (1949)].

I have found that I can economically prepare pyridyl alkyl ketones from the readily available saturated fatty acids.

In carryng out my invention I prepare a gaseous mixture of a cyanopyridine, a saturated fatty acid, and water. This mixture of vapors is passed through a suitable reactor containing a catalyst. The temperature of the reactor is maintained between about 250° C. and 650° C. and preferably between about 375° C. and 500° C. I prefer to conduct my process in a continuous manner although that is not necessary.

The reactor used may be of various types. I prefer the type normally used in carrying out cracking operations in the petroleum industry. Such reactors are of tubular form with suitable connections at entrance and exit. They are provided with means for supporting the bed of catalyst, and are provided with any convenient means for heating them.

The catalyst used may be any of a large number of catalysts which are useful in the preparation of ketones from alkyl carboxylic acids. These catalysts comprise compounds of elements of Groups II and III of the periodic table having an atomic number between 12 and 58 inclusive, compounds of metallic elements of Grop IV, compounds of elements of Series 4 of the periodic table having an atomic number between 23 and 28 inclusive, and mixtures thereof.

A satisfactory way of carrying out my invention is as follows. The parts are by weight.

Example 1.—3-Acetylpyridine

I prepare a gaseous mixture composed of 100 parts of 3-cyanopyridine, 55 parts of water, and 120 parts of acetic acid. I pass the mixture of vapors through a reactor containing a catalytic bed of thoria-alumina catalyst (10% $ThO_2$ on alumina). The temperature of the reactor is maintained at about 425° C. As the vapors of 3-cyanopyridine, water, and acetic acid pass through the reactor, a reaction occurs whereby 3-acetylpyridine (3-pyridyl methyl ketone) is formed. The vapors of the unchanged reactants and the reaction products are condensed as they emerge from the reactor, and the condensate is collected in a suitable receiver. The crude condensate is fractionally distilled under high vacuum to separate the 3-acetylpyridine.

In place of the thoria-alumina catalyst, I may use a large number of other catalysts. Among the catalysts I have found useful in carrying out my reaction are the catalysts which are useful in the preparation of ketones by the decomposition of aliphatic carboxylic acids. Such catalysts include, in addition to the thoria-alumina, uranium dioxide, manganese oxide, alumina, alkaline earth oxides, lead salts, copper, coke, zinc oxide, chromium oxide, vanadium oxide, silica-alumina, manganese chromite, cadmium oxide, zirconium oxide, cerium oxide, and the like.

My invention does not reside in the discovery of a new catalyst. What I have discovered is that the interaction of a cyanopyridine and an aliphatic carboxylic acid in the presence of water vapor yields pyridyl alkyl ketones in good yields.

In Example 1 the molecular equivalents of the reactants used are 3-cyanopyridine one mol, water three mols, and acetic acid two mols. I need not, however, use the specific molal ratios of Example 1. The proportions of the reactants may be varied widely. In general, I prefer to use an excess of water and acetic acid. And I prefer to use a molal excess of water over the acetic acid, but that is not necessary; I need not add water to my reaction mixture as it can be formed by the reaction of acetic acid with itself to form acetone and water.

The temperatures at which my reaction may be conducted may be varied widely. In general, I prefer to have the reaction temperatures above about 375° C. and below about 550° C. More desirably, I prefer that the reaction temperatures should be between about 400° C. and 500° C.

Example 2.—4-Acetylpyridine

The procedure of Example 1 is repeated with the exception that 4-cyanopyridine is used in place of the 3-cyanpyridine and 4-acetylpyridine is recovered.

Example 3.—3,5-Diacetylpyridine

The procedure of Example 1 is repeated with the exception that I use 50 parts of 3,5-dicyanopyridine in place of the 100 parts of 3-cyanopyridine, and I recover 3,5-diacetylpyridine.

Example 4.—3-Methyl-5-Acetylpyridine

The procedure of Example 1 is repeated with the exception that I use 3-methyl-5-cyanopyridine in place of the 3-cyanopyridine, and I recover 3-methyl-5-acetylpyridine.

Example 5.—2-Acetylpyridine

The procedure of Example 1 is repated wtih the exception that I use 2-cyanopyridine in place of the 3-cyanopyridine, and I recover 2-acetylpyridine. The yields of 2-acetylpyridine are not as good as are those of 3-acetylpyridine. The presence of a considerable amount of pyridine in the reaction product indicates that the 2-cyanopyridine tends to undergo decyanation.

Example 6.—3-Butyrylpyridine

The procedure of Example 1 is repeated with the exception that I use 130 parts of butyric acid in place of the 120 parts of acetic acid, and I recover 3-pyridyl propyl ketone (3-butyrylpyridine).

Example 7.—3-Ethyl-4-Acetylpyridine

The procedure of Example 1 is repeated with the exception that I use 3-ethyl-4-cyanopyridine in place of the 3-cyanopyridine, and I recover 3-ethyl-4-acetylpyridine.

*Example 8.—3-Stearylpyridine*

The procedure of Example 1 is repeated with the exception that I use 500 parts of stearic acid in place of the 120 parts of acetic acid. Because of the high boiling point of the 3-stearylpyridine as well as of the stearic acid, I prefer to carry out my reaction in a vacuum.

*Example 9.—3-Acetylpyridine*

I prepare a gaseous mixture composed of 91 parts of 3-cyanopyridine, 211 parts of acetic acid, and 239 parts of water. I pass the mixture of vapors through a fixed bed reactor containing a catalytic bed of a manganese chromite catalyst. This manganese chromite catalyst was prepared in accordance with the procedure given in U.S. Patent Number 2,108,156. The temperature of the reactor was maintained at about 420° C. As the vapors of 3-cyanopyridine, water, and acetic acid pass through the reactor, a reaction occurs whereby 3-acetylpyridine is formed. The vapors of the unchanged reactants and the reaction products are condensed as they emerge from the reactor, and the condensate is collected in a suitable receiver. The crude condensate is fractionally distilled under high vacuum to separate 3-actylpyridine.

*Example 10.—3-Acetylpyridine*

The procedure of Example 1 is followed with the exception that the gaseous mixture used consists of 360 parts of 3-cyanopyridine, 850 parts of acetic acid, and 950 parts of water. The catalyst used is cerium oxide on alumina in place of the thoria catalyst of Example 1.

*Example 11.—3-Acetylpyridine*

The procedure of Example 1 is followed with the exception that the gaseous mixture used consists of 390 parts of 3-cyanopyridine, 900 parts of acetic acid, and 1,000 parts of water. The catalyst used is cadmium oxide on alumina.

*Example 12.—3-Acetylpyridine*

The procedure of Example 1 is repeated with the exception that the gaseous mixture used consists of 600 grams 3-cyanopyridine, 700 grams of acetic acid, and 850 grams of water. The catalyst used is zirconium oxide on alumina.

*Example 13.—3-Propionylpyridine*

The procedure of Example 1 is repeated with the exception that I use a gaseous mixture consisting of 6.07 moles of 3-cyanopyridine, 12.14 moles of propionic acid, and 48.4 moles of water. The catalyst used is 5% thoria on alumina.

*Example 14.—3-Acetylpyridine*

The procedure of Example 1 is repeated with the exception that the catalyst used is 5% thoria on alumina and the temperature of the reactor is maintained at 375° C.

This application is a continuation-in-part of my copending application Serial No. 15,264, filed March 16, 1960, now abandoned.

I claim as my invention:

1. The process of preparing pyridyl alkyl ketones which comprises an interaction of cyanopyridine with alkyl carboxylic acid in the presence of a catalyst comprising a compound selected from the group consisting of a compound of an element of Groups II and III of the periodic table having an atomic number between 12 and 58 inclusive, a compound of a metallic element of Group IV, a compound of an element of Series 4 of the periodic table having an atomic number between 23 and 28 inclusive, and mixtures thereof maintained at a temperature between about 250° C. and 650° C.

2. The process of preparing pyridyl alkyl ketones which comprises mixing the vapor of cyanopyridine with alkyl carboxylic acid, passing the resultant mixture through a reactor containing a catalyst comprising a compound selected from the group consisting of a compound of an element of Groups II and III of the periodic table having an atomic number between 12 and 58 inclusive, a compound of a metallic element of Group IV, a compound of an element of Series 4 of the periodic table having an atomic number between 23 and 28 inclusive, and mixtures thereof, maintained at a temperature between about 375° C. and 500° C. and recovering pyridyl alkyl ketone from the reaction product.

3. The process of claim 2 in which 3-cyanopyridine and acetic acid are used.

4. The process of claim 2 in which 4-cyanopyridine and acetic acid are used.

5. The process of claim 2 in which 2-cyanopyridine and acetic acid are used.

6. The process of claim 2 in which 3,5-dicyanopyridine and acetic acid are used.

7. The process of preparing pyridyl alkyl ketones which comprises mixing the vapor of cyanopyridine with alkyl carboxylic acid, passing the resultant mixture through a reactor containing a thoria-alumina catalyst, maintained at a temperature between about 375° C. and 500° C.

8. The process of claim 7 in which 3-cyanopyridine and acetic acid are used.

9. The process of claim 7 in which 4-cyanopyridine and acetic acid are used.

10. The process of claim 7 in which 2-cyanopyridine and acetic acid are used.

11. The process of claim 7 in which 3,5-dicyanopyridine and acetic acid are used.

12. The process of preparing pyridyl alkyl ketones which comprises mixing the vapor of cyanopyridine with alkyl carboxylic acid, passing the resultant mixture through a reactor containing a manganese-chromite catalyst, maintained at a temperature between about 375° C. and 500° C.

13. The process of preparing pyridyl alkyl ketones which comprises mixing the vapor of cyanopyridine with alkyl carboxylic acid, passing the resultant mixture through a reactor containing a cadmium oxide-alumina catalyst, maintained at a temperature between about 375° C. and 500° C.

14. The process of preparing pyridyl alkyl ketones which comprises mixing the vapor of cyanopyridine with alkyl carboxylic acid, passing the resultant mixture through a reactor containing a cerium oxide catalyst, maintained at a temperature between about 375° C. and 500° C.

15. The process of preparing pyridyl alkyl ketones which comprises mixing the vapor of cyanopyridine with alkyl carboxylic acid, passing the resultant mixture through a reactor containing a zirconium oxide catalyst, maintained at a temperature between about 375° C. and 500° C.

16. The process of preparing pyridyl alkyl ketones which comprises mixing the vapor of cyanopyridine with alkyl carboxylic acid, passing the resultant mixture through a reactor containing a catalyst selected from the group consisting of thoria, cadmium oxide, manganese-chromite, cerium oxide, zirconium oxide, and mixtures thereof maintained at a temperature between about 375° C. and 500° C.

References Cited in the file of this patent
UNITED STATES PATENTS
3,075,989    Godin et al. _____ Jan. 29, 1963